J. HYDE.
PORTABLE KETTLE AND HEATER.

No. 173,641. Patented Feb. 15, 1876.

Witnesses
Harry Howson Jr
Harry Smith

Joseph Hyde,
By his Attorneys
Howson and Son

UNITED STATES PATENT OFFICE.

JOSEPH HYDE, OF WILMINGTON, DELAWARE.

IMPROVEMENT IN PORTABLE KETTLES AND HEATERS.

Specification forming part of Letters Patent No. 173,641, dated February 15, 1876; application filed December 23, 1875.

*To all whom it may concern:*

Be it known that I, JOSEPH HYDE, of Wilmington, Delaware, have invented an Improved Portable Kettle and Heater, of which the following is a specification:

The object of my invention is to construct a simple and handy portable kettle combined with a stove, for the melting of lead, &c., and for heating or boiling of other substances or compositions, my improvement being especially directed to the providing of means for carrying off the products of combustion and thoroughly utilizing the heat.

Figure 1:
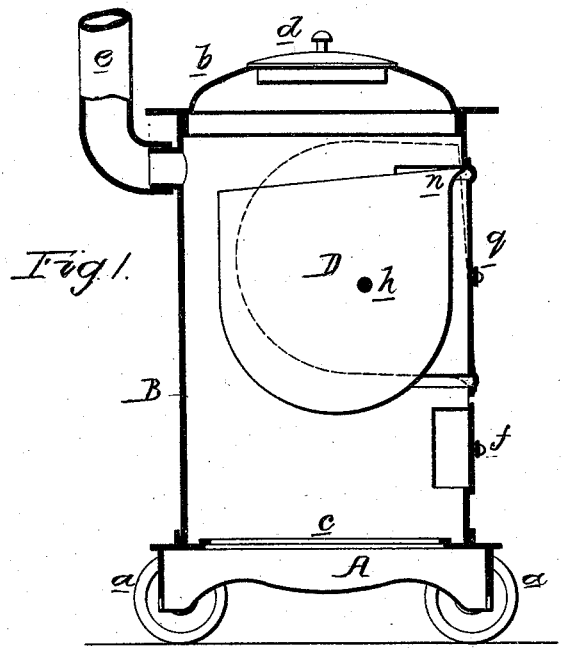
Figure 2:
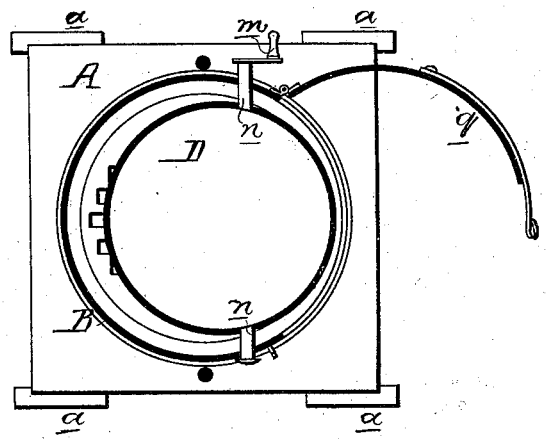

Figures 1 and 2 of the accompanying drawing represent a vertical section and sectional plan of my improved kettle.

To the base A, provided with wheels $a$, is secured a casing, B, in the top $b$ of which is an opening for receiving the detachable cover $d$, an exit-branch projecting from the rear of the casing for receiving a stove-pipe, $e$, for the escape of both the smoke from the fire and the vapors from the heated lead, &c.

On ledges on the base rests a grate, $c$, for receiving fuel introduced through a doorway provided with a suitable hinged door, $f$. D is the kettle, having trunnions $h$ adapted to bearings in the casing, through which one of the said trunnions projects and is furnished with a suitable handle $m$, Fig. 2, by manipulating which the kettle may be easily tilted, as shown by dotted lines in Fig. 1.

The trunnions $h$ are so situated on the kettle that the preponderance of weight shall be on the rear; hence the kettle has a tendency after being tilted, as shown by dotted lines, to return to the position shown in full lines, Fig. 1, beyond which it cannot be turned in the direction of the arrow, owing to its lip $n$ coming in contact with a suitable stop on the casing, in front of which is a doorway large enough to admit the greater portion of the top of the vessel when it is tilted, this doorway being provided with a suitable hinged door, $q$.

When the fuel on the grate has been kindled, and the doors $f$ and $q$ in front of the casing closed, the substances which have been introduced into the kettle through the opening in the top $b$ will be subjected to the desired heat, and when the contents of the vessel have to be withdrawn all that is necessary is to open the large front door $q$, and by manipulating the handle $m$ tilt the kettle so far as to permit the substance to flow from the lip $n$ into any desired receptacle.

I do not desire to claim, broadly, the combination of a heater with a kettle capable of being tilted; but

I claim as my invention—

1. The combination of a portable stove having an exit-flue, $e$, and removable lid $d$, with a tilting kettle within the stove, as and for the purpose set forth.

2. The combination of the stove B having an exit flue, $e$, and cover $d$, with the kettle D admitting of being tilted over the opening closed by the door $q$ of the stove, as set forth.

In testimony whereof I have signed my name to this specification in the presence of two subscribing witnesses.

JOSEPH HYDE.

Witnesses:
HARRY HOWSON, Jr.,
HARRY SMITH.